United States Patent Office 3,452,047
Patented June 24, 1969

3,452,047
OXIDATION OF OLEFINIC COMPOUNDS WITH SOLUTIONS OF THALLIUM(III) SALTS
Alfred H. Frye, Loveland, Ohio, assignor to The Cincinnati Milling Machine Co., Cincinnati, Ohio, a corporation of Ohio
No Drawing. Continuation-in-part of application Ser. No. 509,434, Nov. 23, 1965. This application Oct. 20, 1966, Ser. No. 587,984
Int. Cl. C07c 45/04; B01j 11/32; C07d 13/10
U.S. Cl. 260—340.5                                         15 Claims

ABSTRACT OF THE DISCLOSURE

Aldehydes and ketones are produced in very high yields from oxidizable olefinic compounds by reacting such compounds with less than an equimolar amount of acidic aqueous thallium(III) salt solution.

---

This invention relates to the oxidation of olefinic compounds and more particularly to their oxidation with solutions of thallium(III) salts to produce aldehydic and ketonic compounds. This application is a continuation in part of U.S. Ser. No. 509,434 filed Nov. 23, 1965 now abandoned.

Among the two or three most basic and important reactions in the chemical process industry are oxidations in which an atom of oxygen is selectively introduced into the molecular structure of an olefinic hydrocarbon to furnish in high yield an oxygenated product belonging either to the aldehyde, ketone, or epoxide classes of compounds. The recently commercialized Wacker process, for example, is based in part on the oxidation of an olefin, and especially ethylene, with an aqueous solution of a palladium salt, to furnish in high yield an aldehyde or ketone, and in part on the reoxidation, with molecular oxygen in the presence of a copper salt catalyst, of the concomitantly produced elemental palladium, regenerating thereby the palladium salt required for further olefin oxidation. As might be expected, the salts of most other metals have been extensively investigated to determine whether any of them might also be useful in this or a similar capacity, and a review of the literature shows that these investigations have not neglected the salts of thallium.

In following the teachings of the prior art, and indeed as is evident in the disclosures of the prior art reports themselves, I have found that the use of thallium(III) salts for the oxidation of olefinic hydrocarbons, when practiced in accord with those teachings, results in complex mixtures of end products which are both difficult and costly to recover from the reaction medium and to separate from each other, and furnishes the desired end products in such low yield as to render the process not only economically and commercially unattractive, but also impractical even as a laboratory method of preparation.

It is an object of this invention to overcome the inadequacies and disadvantages of the prior art, and to provide a practical, economical, and commercially attractive process for the production of useful aldehydes and ketones from olefinic compounds.

It is a further object of this invention to provide a process for the production of aldehydes and ketones from olefinic compounds in such a way that in most, if not all, cases essentially only one oxidation product is obtained from a given compound, and wherein the costliness and difficulty of separating that product from the other components in the reaction mixture are virtually eliminated, and wherein the desired product is obtained quickly and in high yield.

Other objects and advantages of this invention will be apparent from the following description.

According to this invention, various olefinic compounds are oxidized to aldehydes or ketones in high yields by intimately contacting the olefinic compound with substantially less than an equimolecular amount of an acidic aqueous thallium(III) salt solution. The increase in yield of the desired oxidation product obtained when the olefinic compound is used in excess according to this invention, when compared with the yield obtained by using the olefinic compound with at least about a stoichiometrical equivalent or equimolecular amount of the thallium(III) salt is great, and thus provides a process of high commercial attractiveness. By means of this invention, yields of the desired oxidation products in the range of 50 to 90 percent and even higher are obtainable, the products being easily isolable from the reaction mixture by the use of a further feature of this invention, namely, by the use, as an extractant, of further quantities of the olefinic compound being oxidized. The extract can then be advantageously used as feed stock for subsequent oxidation with regenerated thallium(III) salt solution.

Although I do not wish to be bound by the explanation, it is believed that the use of an excess of the olefinic compound, i.e., an excess over the equivalent or stoichiometric requirement, as defined by the equation:

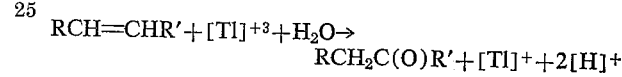

$$RCH=CHR' + [Tl]^{+3} + H_2O \rightarrow RCH_2C(O)R' + [Tl]^+ + 2[H]^+$$

tends to prevent the wasteful and unwanted oxidative destruction of the desired and initially formed aldehydic or ketonic product, which oxidative destruction gives rise to the formation of a complex mixture of difficultly separable products and at the same time wastefully consumes the thallium(III) oxidizing agent, all these and other defects being inherent in the teachings of the prior art. Additionally, I have found that the presence of excess olefinic compound causes the quick and sharp separation of the bulk of the organic material from the aqueous phase, thus adding greatly to the ease and efficiency of recovering the desired end product, as well as shortening the exposure time of the highly reactive aldehydic and ketonic products to the acidic medium which catalyzes their unwanted and wasteful polymerization. These benefits taken together make possible the economically attractive high yields of aldehydic and ketonic products provided by my invention. As a specific illustration of the destructive attack of an aldehydic product by the thallium(III) salt, I have found that the phenylacetaldehyde, which is the product initially formed by the thallium(III) oxidation of styrene, is further attacked by the thallium(III) ion giving rise to benzaldehyde and formic acid according to the equation:

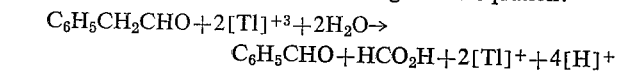

$$C_6H_5CH_2CHO + 2[Tl]^{+3} + 2H_2O \rightarrow C_6H_5CHO + HCO_2H + 2[Tl]^+ + 4[H]^+$$

When styrene is oxidized with thallium(III) sulfate using one mole of thallium(III) sulfate per mole of styrene, as specified in the teachings of the prior art, I have found that the yield of phenylacetaldehyde amounts to only 0.5%; however, when the reaction is carried out using, according to the teachings of my invention, one gram equivalent of thallium(III) sulfate per gram mole of styrene plus an additional gram mole of styrene, I obtain a yield of phenylacetaldehyde of the order of 90% or better.

The practice of this invention is simple and uncomplicated and is operable at normal room temperatures and atmospheric pressures and requires no catalysts for its efficient operation. Intimate contact of the olefinic compound with the aqueous thallium(III) salt solution may be effected with conventional stirring apparatus. When the oxidation is complete, as is signalled by the complete reduction of thallium(III) to thallium(I), agitation of the reaction mixture is discontinued and the organic materials, essentially a solution of the desired aldehydic or ketonic product in the excess of olefinic compound rise to the top and may be easily separated from the aqueous salt solution by conventional mechanical means. Fractional distillation of this solution separates the desired end product from the olefinic compound which may then be recycled. By extraction of the spent aqueous liquor with fresh olefinic compound as extractant, most, if not all, of the aldehydic or ketonic product dissolved therein may be efficiently removed and this extract then may serve as olefinic compound feed stock in the next oxidation. The process, because of the speed at which it proceeds and because of the rapidity with which the organic and aqueous phases separate, may conveniently be carried out continuously by introducing both the olefinic compound and the aqueous thallium(III) salt solution into the base of a cylindrical reaction tower equipped with an efficient stirring mechanism and a series of baffles. The reaction produces issue from the head of the column and move to a conventional liquid-liquid separator, from which the organic phase is sent to a continuous distillation still, while the aqueous phase is sent to a counter current extractor for extraction with the olefin to be oxidized.

In general, any thallium salt may be employed, provided its solubility in aqueous acid is relatively high in both its monovalent and trivalent states of oxidation and that no slightly soluble complex salts are formed when either exists in the presence of the other. Thus, I find that the sulfate, the nitrate, the fluoroborate and the like are useful, whereas neither the chloride, the bromide, nor the iodide are suitable because of the very low solubility of these salts in their monovalent states, and because they form slightly soluble complexes involving the cations in both their monovalent and trivalent states such as $Tl_3(TlCl_6)$. Additionally, it is essential that the aqueous solution of the thallium(III) salts should contain an appreciable amount of free acid in order to inhibit the hydrolysis of the salt and prevent the precipitation of the insoluble thallium(III) oxide. For example, if one attempts to dissolve thallium(III) sulfate in water containing no acid, it is found that it undergoes immediate hydrolysis with the precipitation of the dark brown thallium(III) oxide according to the equation:

$$Tl_2(SO_4)_3 + 3H_2O \rightarrow Tl_2O_3 + 3H_2SO_4$$

I have found that, in general, any salt of thallium may be used, provided it has in both its oxidation states a solubility in dilute aqueous acid at 30° C. of at least about 4 grams of salt per 100 grams of solution.

Oxidizable olefinic compounds in general may be employed in the practice of this invention, e.g., the isomeric pentenes, hexenes, and heptenes, the alicyclic olefins such as cyclopentene and cyclohexene, and the aryl-substituted olefins such as styrene, alpha-methylstyrene, indene, and the dihydronaphthalenes. In addition, it is possible to employ this method of oxidation to a variety of olefins which contain in their molecular structure, one or more atoms of elements other than carbon or hydrogen, e.g., safrole (3,4-dioxymethyleneallylbenzene), anethole(p-methoxyisoallylbenzene), p-methoxystyrene, m-chlorostyrene, and the like.

The following examples will serve to illustrate this invention, but are not to be taken as limiting its scope.

EXAMPLE 1

In a 2-liter, 3-neck flask equipped with an efficient mechanical stirrer and an immersion thermometer was placed 1,110 milliliters of an aqueous thallium(III) sulfate solution containing 0.50 gram ion $[Tl]^{+3}$ and 2.22 gram ions $[SO_4]^{-2}$. To this solution, while stirring, there was added all at once 104.1 grams (1.00 mole) of styrene. At the end of 10 minutes, a qualitative test for the $[Tl]^{+3}$ ion showed that the reaction was complete. The reaction mixture was transferred to a separatory funnel and the aqueous and organic phases were separated.

The aqueous phase was extracted with three 69.4 gram portions of styrene, the weights of the resultant extracts being 75.2 g., 70.5 g., and 69.6 g., respectively. Thereafter, the aqueous phase was extracted with two 38.4 gram portions of cyclohexane, the weights of the resultant extracts being 37.9 g. and 37.6 g., respectively. Vapor fractometric analysis of the first cyclohexane extract showed the presence of a moderate amount of styrene, but no phenylacetaldehyde. The second cyclohexane extract showed the presence of neither styrene nor phenylacetaldehyde.

The organic phase (103.9 g.) was combined with the three styrene extracts and the combined materials washed with about 40 ml. of water. A 180.5 g. portion of this material (total weight, 318.9 g.) was subjected to distillation at reduced pressure in a spinning band column to furnish the following fractions, the compositions of which were estimated by vapor phase fractometric analysis.

| Fraction No. | Weight (g.) | Percent composition | |
| --- | --- | --- | --- |
| | | $C_6H_5CH=CH_2$ | $C_6H_5CH_2CHO$ |
| 1 | 145.3 | 100 | 0 |
| 2 | 0.24 | 9 | [1] 90 |
| 3 | 30.82 | 1 | 99 |
| Residue | 1.53 | | |
| $CO_2$ trap | 1.60 | 90 | [1] 10 |

[1] Traces of benzaldehyde were also present.

By adjustment of the weights of the above fractions to the amounts which would have been obtained had the entire 318.9 g. of organic material been subjected to distillation, it was found that the adjusted weight of fraction 3 alone (based on the amount of $[Tl]^{+3}$ ion taken for reaction) constitutes a 90.7% yield of phenylacetaldehyde. Similarly, by taking the adjusted weight of fraction 1, it was found that 98.5% of the theoretically unreacted styrene had been recovered.

EXAMPLE 2

In the apparatus described in Example 1, there was placed 1,300 milliliters of aqueous thallium(III) sulfate solution containing 0.498 gram ion $[Tl]^{+3}$ and 1.34 gram ion $[SO_4]^{-2}$. To this solution, while stirring, was added all at once 117.7 grams (0.996 mole) alpha-methylstyrene. At the end of 16 minutes a qualitative test for the $[Tl]^{+3}$ ion showed that the reaction was complete, the temperature of the reaction mixture having risen from 25° C. to 29° C. The mixture was transferred to a separatory funnel and the aqueous and organic phases separated.

The aqueous phase was extracted with three 78.5 g. portions of alpha-methylstyrene and then with two portions of cyclohexane (38.5 g. and 39.6 g.). The weights of the resultant extracts were:

|  | Grams |
| --- | --- |
| 1st, alpha-methylstyrene extract | 82.0 |
| 2nd, alpha-methylstyrene extract | 80.5 |
| 3rd, alpha-methylstyrene extract | 79.1 |
| 1st, cyclohexane extract | 38.0 |
| 2nd, cyclohexane extract | 38.6 |

Vapor phase fractometric analysis of the cyclohexane extracts showed the first to contain a small amount of alpha-methylstyrene but no benzyl methyl ketone.

The organic phase (119.9 g.) was combined with the alpha-methylstyrene extracts and washed with 50 ml. of water. A 200.7 g. portion of this combined material (360.1 g.) was then subjected to distillation at reduced pressure in the spinning band column to furnish the following fractions, the percent compositions of which were evaluated by vapor phase fractometric analysis.

| Fraction No. | Weight (g.) | Percent composition | |
|---|---|---|---|
| | | $C_6H_5C(CH_3)=CH_2$ | $C_6H_5CH_2C(O)CH_3$ |
| 1 | 164.0 | 100 | |
| 2 | 0.57 | | |
| 3 | 35.66 | | 100 |
| 4 | 0.04 | | |
| Residue | 0.02 | | |
| CO₂ trap | 0.20 | | |

By adjustment of the weights of the above distillation fractions to the amounts which would have been obtained had the entire 360.1 g. of organic material been distilled, it was found that fraction 3 constitutes a 96% yield of benzyl methyl ketone (based on the amount of [Tl]$^{+3}$ ion taken for reaction), whereas fraction 1 constitutes a 99% recovery of the theoretically unreacted alpha-methylstyrene.

EXAMPLE 3

In the same apparatus used in Example 1, there was placed 1,280 milliliters of an aqueous thallium(III) sulfate solution containing 0.485 gram ion [Tl]$^{+3}$ and 1.16 gram ion [SO$_4$]$^{-2}$. To this solution, while stirring, was added all at once 81.7 g. (0.97 mole) of 1-hexene. At the end of 50 minutes, a qualitative test for [Tl]$^{+3}$ ion showed that the reaction was complete, the temperature of the reaction mixture having risen from 23° C. to 34° C. The mixture was transferred to a separatory funnel and the aqueous and organic phases separated.

The aqueous phase was extracted first with three 54.5 g. portions of 1-hexene and then with two 38.5 g. portions of cyclohexane. The weights of the resultant extracts were as follows:

| | Grams |
|---|---|
| 1st, 1-hexene extract | 55.8 |
| 2nd, 1-hexene extract | 52.5 |
| 3rd, 1-hexene extract | 55.7 |
| 1st, cyclohexane extract | 37.6 |
| 2nd, cyclohexane extract | 38.2 |

The vapor phase fractograms of the cyclohexane extracts showed the presence of moderate amounts of 2-hexanone, and the aqueous raffinate gave a positive test wih 2,4-dinitrophenylhydrazine.

The organic phase (67.4 g.) was combined with the 1-hexene extracts and washed with a little water. A 141.4 g. portion of the combined materials (231.4 g.) was taken for distillation under reduced pressure in the spinning band column to furnish the following fractions, the percent compositions of which were evaluated by vapor phase fractometry.

| Fraction No. | Weight (g.) | Percent composition | |
|---|---|---|---|
| | | $C_4H_9CH=CH_2$ | $C_4H_9C(O)CH_3$ |
| 1 | 109.7 | 97 | 3 |
| 2 | 1.54 | | |
| 3 | 6.71 | | |
| 4 | 16.76 | | |
| 5 [1] | 1.24 | | 90 |
| Residue | 0.47 | | |
| CO₂ trap | 3.82 | | |

[1] The vapor phase fractogram showed the presence of minor amounts of 7 unidentified impurities. 2-hexanone was identified as its 2,4-dinitrophenylhydrazone derivative.

Adjustment of the weights of the above fractions to the amounts which would have been obtained had the entire 231.4 g. of organic material been distilled, shows that fraction 4 constitutes a 56.5% yield of 2-hexanone (based upon the amount of [Tl]$^{+3}$ taken for reaction), whereas fraction 1 constitutes an 87.8% recovery of the theoretically unreacted 1-hexene.

EXAMPLE 4

When 1,350 milliliters of an aqueous thallium(III) sulfate solution, containing 0.49 gram ion [Tl]$^{+3}$ and 1.22 gram ion [SO$_4$]$^{-2}$ was treated with 79.5 grams (0.98 mole) cyclohexene, as detailed in the preceding examples, it was found that the reaction was complete at the end of 15 minutes. The reaction mixture was transferred to a separatory funnel and the organic and aqueous phases separated.

The aqueous phase was extracted first with three 53.0 g. portions of cyclohexene, and then with two 38.5 g. portions of cyclohexane to furnish extracts having the following weights:

| | Grams |
|---|---|
| 1st, cyclohexene extract | 56.3 |
| 2nd, cyclohexene extract | 54.2 |
| 3rd, cyclohexene extract | 52.8 |
| 1st, cyclohexane extract | 36.3 |
| 2nd, cyclohexane extract | 38.1 |

Vapor phase fractometric analysis of the cyclohexane extracts showed the presence of appreciable amounts of formylcyclopentane, the first extract having almost twice the amount of that compound as the second.

The organic phase (76.1 g.) and the cyclohexene extracts were combined, washed with about 50 ml. of water, and a 177.5 g. portion of the combined material (237.6 g.) was taken for distillation under reduced pressure in the spinning band column. The following fractions were obtained, their percent compositions being evaluated by vapor phase fractometry.

| Fraction No. | Weight (g.) | Percent composition | |
|---|---|---|---|
| | | $C_6H_{10}$ | $C_5H_9CHO$ |
| 1 | 134.5 | 99 | 1 |
| 2 | 0.82 | 20 | 80 |
| 3 | 25.32 | | 100 |
| 4 | 0.31 | | |
| Residue | 1.73 | | |
| CO₂ trap | 14.40 | 60 | 40 |

Adjustment of the weights of the above distillation fractions to the amounts which would have been obtained had the entire 237.6 g. been distilled shows that fraction 3 based on the amount of [Tl]$^{+3}$ taken for reaction constitutes a 70.4% yield of formylcyclopentane (identified as its 2,4-dinitrophenylhydrazone derivative), whereas fraction 1 constitutes an 88.2% recovery of the theoretically unreacted cyclohexene.

EXAMPLE 5

Treatment of 84.0 g. (1.0 mole) of 2-hexene with 1,170 milliliters of an aqueous thallium(III) sulfate solution containing 0.5 gram ion [Tl]$^{+3}$ and 1.25 gram ion [SO$_4$]$^{-2}$, as detailed in the preceding examples, required 1.5 hours for completion of the reaction.

After the organic and aqueous phases were separated, the aqueous phase was extracted with three 59.0 g. portions of 2-hexene, and then with two 38.5 g. portions of cyclohexane to furnish extracts having the following weights:

| | Grams |
|---|---|
| 1st, 2-hexene extract | 61.1 |
| 2nd, 2-hexene extract | 59.9 |
| 3rd, 2-hexene extract | 58.9 |
| 1st, cyclohexane extract | 37.7 |
| 2nd, cyclohexane extract | 38.1 |

Vapor phase fractometric analysis of the cyclohexane extracts showed them to contain some 2-hexene, but no hexanones; nevertheless, the aqueous phase still smelled of ketonic material.

The 2-hexene extracts were combined with the organic phase (76.6 g.) and the combined solution washed with a little water. A 144.6 g. portion of the combined material (252.6 g.) was taken for distillation at reduced pressure in the spinning band column to furnish the following fractions, the percent compositions of which were estimated by vapor phase fractometric analysis.

| Fraction No. | Weight (g.) | Percent composition | |
|---|---|---|---|
| | | $C_3H_7CH=CHCH_3$ | 2- and 3-hexanone [1] |
| 1 | 114.8 | 100 | |
| 2 | 1.10 | 33 | 67 |
| 3 | 1.58 | 33 | 67 |
| 4 | 14.11 | 3 | 95 |
| 5 | 0.55 | 3 | 90 |
| Residue | 7.21 | | |
| $CO_2$ trap | 2.00 | | |

[1] A 2-to-1 mixture of the isomeric 3- and 2-hexanones identified by infrared spectoscopy and by the melting points of their 2,4-dinitrophenylhydrazone derivatives.

By adjustment of the weights of the above distillation fractions to the amounts which would have been obtained had the entire 252.6 g. of organic material been distilled, and by assuming fraction 4 to to be essentially a mixture of the isomeric 2- and 3-hexanones, it was found that, by itself, fraction 4 constitutes a 49.5% yield of those ketones based on the amount of $[Tl]^{+3}$ taken for reaction. Similarly, the adjusted weight of fraction 1 constitutes a 92.0% recovery of the theoretically unreacted 2-hexene.

EXAMPLE 6

In a manner similar to that of Example 1, 3,390 milliliters of aqueous thallium(III) nitrate solution containing 0.925 gram ion $[Tl]^{+3}$ and 5.1 gram ions $[NO_3]^-$ was placed in a 5-liter 3-neck flask fitted with a mechanical stirrer and an immersion thermometer. To the stirred solution, 191.6 g. (1.850 moles) of the styrene was added in one portion and the mixture stirred vigorously. At the end of 10 minutes the temperature of the reaction mixture had risen from 25° C. to 32° C., and a qualitative test for the $[Tl]^{+3}$ ion showed the reaction to be complete. The mixture was allowed to cool to room temperature, transferred to a 2-liter separatory funnel and the aqueous and organic phases separated.

The aqueous phase was extracted with three 96.3 g. portions of styrene and the resultant extracts found to have increased in weight by 21.8 g., 7.4 g., and 1.7 g., respectively. Thereafter, the aqueous phase was extracted with two 76.8 g. portions of cyclohexane and the resultant extracts found to weight 76.5 g. and 75.4 g. Vapor phase fractometric analysis of the cyclohexane extracts showed them to contain styrene together with slight amounts of phenylacetaldehyde.

The organic phase, which was slightly yellow and weighed 169.6 g., was combined with the styrene extracts, washed with about 50 ml. of water, and the somewhat turbid material clarified by filtration through a small plug of glass wool to furnish 487.0 g. of clear material. A 202.5 g. portion of this was then subjected to distillation at reduced pressure to give the following fractions, the compositions of which were estimated by vapor phase fractometric analysis.

| Fraction No. | Weight (g.) | Percent composition | |
|---|---|---|---|
| | | $C_6H_5CH=CH_2$ | $C_6H_5CH_2CHO$ |
| 1 | 140.2 | 94 | 6 |
| 2 | 0.56 | 25 | 75 |
| 3 | 0.49 | 2 | 98 |
| 4 | 36.56 | <1 | <100 |
| Residue | 3.48 | | |
| $CO_2$ trap | 19.10 | 98 | 2 |

By adjustment of the weights of the above fractions to the amounts which would have been obtained had the entire 487.0 g. of organic material been subjected to distillation, and by taking fractions 3 and 4 to be pure phenylacetaldehyde, it was found that the yield of that product (based on the amount of $[Tl]^{+3}$ taken for reaction) was 80.3%. Similarly, by combining the adjusted weights of fraction 1 and the material collected in the Dry Ice trap, and by assuming them to be pure styrene, it was found that 99% of the theoretically unreacted styrene had been recovered.

EXAMPLE 7

In a manner similar to that of Example 1, 1,830 milliliters of aqueous thallium(III) fluoroborate solution containing 1.27 gram ions $[Tl]^{+3}$ and 6.23 gram ions $[BF_4]^-$ was placed in a 5-liter 3-neck flask fitted with an immersion thermometer and a mechanical stirrer. To the stirred solution, 264.4 g. (2.54 moles) of the styrene was added in one portion and the mixture stirred vigorously. At the end of 14 minutes a qualitative test for the $[Tl]^{+3}$ ion showed that the reaction was complete, the temperature of the reaction mixture having risen from 24° C. to 40° C. The reaction mixture was transferred to a separatory funnel and the aqueous and organic phases were separated. The organic phase was found to weigh 261.9 g.

The aqueous phase was extraced with three 132.2 g. portions of styrene and the resultant extracts were found to weigh 149.1 g., 135.5 g., and 133.1 g., respectively. The aqueous phase was next extracted with two 85.4 g. portions of cyclohexane. These extracts weighed 84.3 and 84.0 g., respectively. Vapor fractometric analysis of the cyclohexane extracts showed the first to contain a moderate amount of styrene, but no phenylacetaldehyde, while the second showed the presence of only a slight amount of styrene.

The organic phase and the styrene extracts were combined and washed with about 50 ml. of water. The turbid liquid, which weighed 677.9 g., was then dried for about 45 minutes with a little anhydrous sodium sulfate. A 204.0 g. portion of the dried and clarified liquid was then taken for distillation at reduced pressure in the spinning band column to furnish the following fractions, the percent composition of which was evaluated by vapor phase fractometry.

| Fraction No. | Weight (g.) | Percent composition | |
|---|---|---|---|
| | | $C_6H_5CH=CH_2$ | $C_6H_5CH_2CHO$ |
| 1 | 152.4 | 100 | 0 |
| 2 | 0.81 | 90 | 10 |
| 3 | 0.32 | 50 | 50 |
| 4 | 1.09 | 33 | 67 |
| 5 | 34.15 | 0 | 100 |
| Residue | 10.36 | | |
| $CO_2$ trap | 2.80 | 98 | 2 |

By adjustment of weights of the above distillation fractions to the amounts which would have been obtained had the entire 677.9 g. of material been subjected to distillation, it was found that fraction 5 alone constitutes a 74.5% yield of phenylacetaldethyde based on the amount of thallium(III) taken for reaction. Similarly, by assuming the material collected in the Dry Ice trap to be pure styrene and by taking the adjusted weight of it and fraction 1 together, it was found that 97.4% of the theoretically unreacted styrene was recovered.

EXAMPLE 8

This example illustrates the adaptability of the process of this invention to continuous operation, wherein the reaction products move to the top of a reaction tower and thence may be sent to a liquid-liquid separator from which the organic phase is sent to a continuous distillation still, while the aqueous phase moves to a counter current extractor for extraction with the olefin to be oxidized.

Into the base of a cylindrical reaction tower, measuring 32 inches in length and having an inside diameter of 1.75 inches, equipped with an efficient stirring mechanism and a series of horizontal baffle plates, there was introduced an aqueous thallium(III) sulfate solution and styrene, their flow rates being adjusted to approximately 30 ml. and 2.82 ml. per minute, respectively. At those rates, the molar ratio at which styrene and thallium(III) ion entered the reactor was approximately 2-to-1. The reaction mixture which issued from the head of the column gave a negative test for $[Tl]^{+3}$ ion and was collected in a separatory funnel where the organic and aqueous phases separated. At the end of 102 minutes, 2,870 ml. of the aqueous thallium(III) solution, which contained 1.18 gram ions $[Tl]^{+3}$ and 3.73 gram ions $[SO_4]^{-2}$, and 240.0 g. (2.3 moles) of styrene had been introduced into the reactor. Stirring was continued for an additional 10 minutes and then stopped. The reaction mixture yet remaining in the column was drained out and the column thoroughly flushed with spent aqueous thallium(I) sulfate solution. The separated organic phase was found to weigh 234.8 g.

The aqueous phase (2,840 ml.) was extracted with three portions of styrene (weighing 40.8 g., 40.2 g., and 40.2 g., respectively) and then with two portions of cyclohexane (weighing 76.1 g. and 75.7 g., respectively). The weights of the resultant extracts were as follows:

|  | Grams |
|---|---|
| 1st, styrene extract | 49.7 |
| 2nd, styrene extract | 45.2 |
| 3rd, styrene extract | 42.6 |
| 1st, cyclohexane extract | 75.8 |
| 2nd, cyclohexane extract | 73.4 |

Vapor phase fractometric analysis of these extracts indicated that the three styrene extracts contained 8.6 g., 3.6 g., and 1.4 g. of phenylacetaldehyde, respectively, whereas the cyclohexane extracts contained only very small amounts of phenylacetaldehyde and styrene.

A 148.8 g. portion of the organic phase (total weight 234.8 g.) was taken for distillation under reduced pressure in the spinning band column to furnish the following fractions, the percent compositions of which were estimated by vapor phase fractometry.

| Fraction No. | Weight (g.) | Percent composition | |
|---|---|---|---|
| | | $C_6H_5CH=CH_2$ | $C_6H_5CH_2CHO$ |
| 1 | 70.0 | 98 | 2 |
| 2 | 1.0 | 90 | 10 |
| 3 | 64.5 | 1 | 99 |
| Residue | 5.9 | | |
| $CO_2$ trap | 5.0 | 98 | 2 |

If the weights of the above fractions are adjusted to the values which would have been obtained had the entire 234.8 g. of organic phase been distilled, then fraction 3 itself constitutes a 74% conversion to phenylacetaldehyde (based on the amount of $[Tl]^{+3}$ ion taken for reaction), whereas the adjusted and combined weights of fraction 1 and the Dry Ice trap constitute a 98% recovery of the theoretically unreacted styrene.

EXAMPLE 9

In a 0.5-liter, 3-neck flask equipped with an efficient mechanical stirrer and an immersion thermometer was placed 222 ml. of an aqueous thallium(III) sulfate solution containing 0.10 mole of $[Tl]^{+3}$ and 0.438 mole of $[SO_4]^{-2}$. To this solution, while stirring, there was added all at once 31.6 g. (0.213 mole) of anethol (p-methoxy-β-methylstyrene). At the end of 1.5 hrs., a qualitative test for the $[Tl]^{+3}$ ion showed that the reaction was complete. The reaction mixture was transferred to a separatory funnel and the aqueous and organic phases were separated. The aqueous phase was then successively extracted with two 14.8 g. portions of anethole, the weights of the initial spontaneously separating organic phase and the two extracts being 34.0, 14.8, and 14.9 g. respectively.

The organic phase and the two extracts were combined, washed with about 20 ml. of 6 N $H_2SO_4$, reweighed (60.8 g.) and subjected to distillation under reduced pressure (0.4 torr) in a spinning band column. A total weight of 42.6 g. of anethole was recovered, together with 15.6 g. of material having $\eta D^{24}$ 1.5262 (lit. for p-methoxyhydratropaldehyde $\eta D^{25}$ 1.5257), and forming a semicarbazone derivative M.P. 135–136° (lit. for p-methoxyhydratropaldehyde 130–131°), and which analyzed satisfactorily for that compound. (Found: C, 59.65%; H, 6.77%. Theory: C, 59.71%, H, 6.83%.) Accordingly, the yield of p-methoxyhydratropaldehyde was 67%.

EXAMPLE 10

In a 0.5 liter, 3-neck flask equipped with an efficient mechanical stirrer and an immersion thermometer was placed 242 ml. of an aqueous thallium(III) sulfate solution containing 0.10 mole of $[Tl]^{+3}$ and 0.44 mole of $[SO_4]^{-2}$. To this solution, while stirring, there was added all at once 30.5 g. (0.20 mole) of p-chloro-α-methylstyrene. At the end of 2 hrs., a qualitative test for the $[Tl]^{+3}$ ion showed that the reaction was complete. The reaction mixture was transferred to a separatory funnel and the aqueous and organic phases separated. The aqueous phase was successively extracted with two 15.2 g. portions of chloro-α-methylstyrene. The weights of the initial spontaneously separating organic phase and of the two extracts were 32.9, 16.6, and 14.9 g. respectively.

The organic phase and the two extracts were combined, washed with about 20 ml. of 6 N $H_2SO_4$, reweighed (58.2 g.) and subjected to distillation under reduced pressure (0.2 torr) in a spinning band column. A total weight of 41.3 g. of p-chloro-α-methylstyrene was recovered, together with 14.5 g. of material having $\eta D^{24}$ 1.5342 (lit. for p-chlorophenylacetone $\eta D^{20}$ 1.5328) and forming a semicarbazone derivative M.P. 188–189° C. (lit. for p-chlorophenylacetone 188° C.). Accordingly, the yield of p-chlorophenylacetone was 86%.

EXAMPLE 11

In a 0.5 liter, 3-neck flask equipped with an efficient mechanical stirrer and an immersion thermometer was placed 250 ml. of an aqueous thallium(III) sulfate solution containing 0.10 mole of $[Tl]^{+3}$ and 0.44 mole of $[SO_4]^{-2}$. To this solution, while stirring, there was added all at once 32.8 g. (0.20 mole) of p-nitro-α-methylstyrene dissolved in 50 ml. of benzene. At the end of 4 hrs., a qualitative test for the $[Tl]^{+3}$ ion showed that the reaction was complete. The reaction mixture was transferred to a separatory funnel and the aqueous and organic phases were separated. The aqueous phase was then extracted with a 21.8 g. portion of benzene, the weights of the initial spontaneously separating organic phase and the extract being 72.3 g. and 22.0 g., respectively.

The organic phase and the extract were combined, washed with about 20 ml. of 6 N $H_2SO_4$, reweighed (93.3 g.) and the benzene removed by atmospheric distillation with 61.2 g. being recovered. The pot residue weighed 31.7 g. Approximately half of this residue (15.0 g.) was dissolved in 25 ml. of diethyl ether, 150 ml. of petroleum ether (B.R. 20–49° C.) added and the flask placed in the refrigerator over night. On filtration there was obtained 5.0 g. of p-nitrophenylacetone having a M.P. of 63–64° C. (lit. M.P. 62–63° C.), and forming a 2,4-dinitrophenylhydrazone derivative M.P. 182–184° C. (lit. M.P. 185–186° C.). Accordingly, the yield of p-nitrophenylacetone was 59%.

It should be understood that the foregoing examples are merely illustrative and many modifications and alterations may be made in the practice of this invention without departing from the spirit and scope thereof.

In a manner similar to that described in the examples, it was found that when a two-fold excess of various other olefins, as for example alpha-methylstyrene, were oxidized with aqueous solutions of either thallium(III) fluoroborate or nitrate, high yields of the resultant aldehydic or ketonic products were obtained.

What is claimed is:

1. A process for the production of a product of the class consisting of aldehydes and ketones which comprises intimately contacting an oxidizable olefinic compound with less than an equimolar amount of an acidic aqueous thallium(III) salt solution and thereafter recovering the resultant product of the hereinbefore described class.

2. A process for the production of a product of the class consisting of aldehydes and ketones which comprises intimately contacting an olefinic compound with 10 to 90% less than an equimolar amount of an acidic aqueous thallium(III) salt solution and thereafter recovering the resultant product of the hereinbefore described class.

3. The process of claim 1 wherein the resultant product is recovered by means of the olefinic compound as an extractant of the aqueous phase.

4. The process of claim 3 in which the extract is employed for subsequent oxidation with aqueous thallium (III) salt solution.

5. The process of claim 1 wherein the salt is thallium (III) sulfate.

6. The process of claim 1 wherein the salt is thallium (III) nitrate.

7. The process of claim 1 wherein the salt is thallium (III) fluoroborate.

8. The process of claim 1 wherein the olefinic compound is styrene.

9. The process of claim 1 wherein the olefinic compound is alpha-methylstyrene.

10. The process of claim 1 wherein the olefinic compound is cyclohexene.

11. The process of claim 1 wherein the olefinic compound is 1-hexene.

12. The process of claim 1 wherein the olefinic compound is 2-hexene.

13. The process of claim 1 wherein the olefinic compound is safrole.

14. The process of claim 1 wherein the olefinic compound is anethole.

15. The process of claim 1 wherein the olefinic compound is p-methoxystyrene.

References Cited

UNITED STATES PATENTS

| 2,609,395 | 9/1952 | Dougherty et al. | |
| 2,851,496 | 9/1958 | Cates. | |
| 3,048,636 | 8/1962 | Grinstead | 260—604 |

FOREIGN PATENTS 212,299   12/1960   Austria.

DANIEL D. HORWITZ, *Primary Examiner.*

U.S. Cl. X.R.

260—542, 590, 597, 598, 599, 600